H. K. NORTON.
DUPLEX STEREOSCOPIC MOTION PICTURE CAMERA.
APPLICATION FILED JULY 1, 1916.
1,267,689.
Patented May 28, 1918.
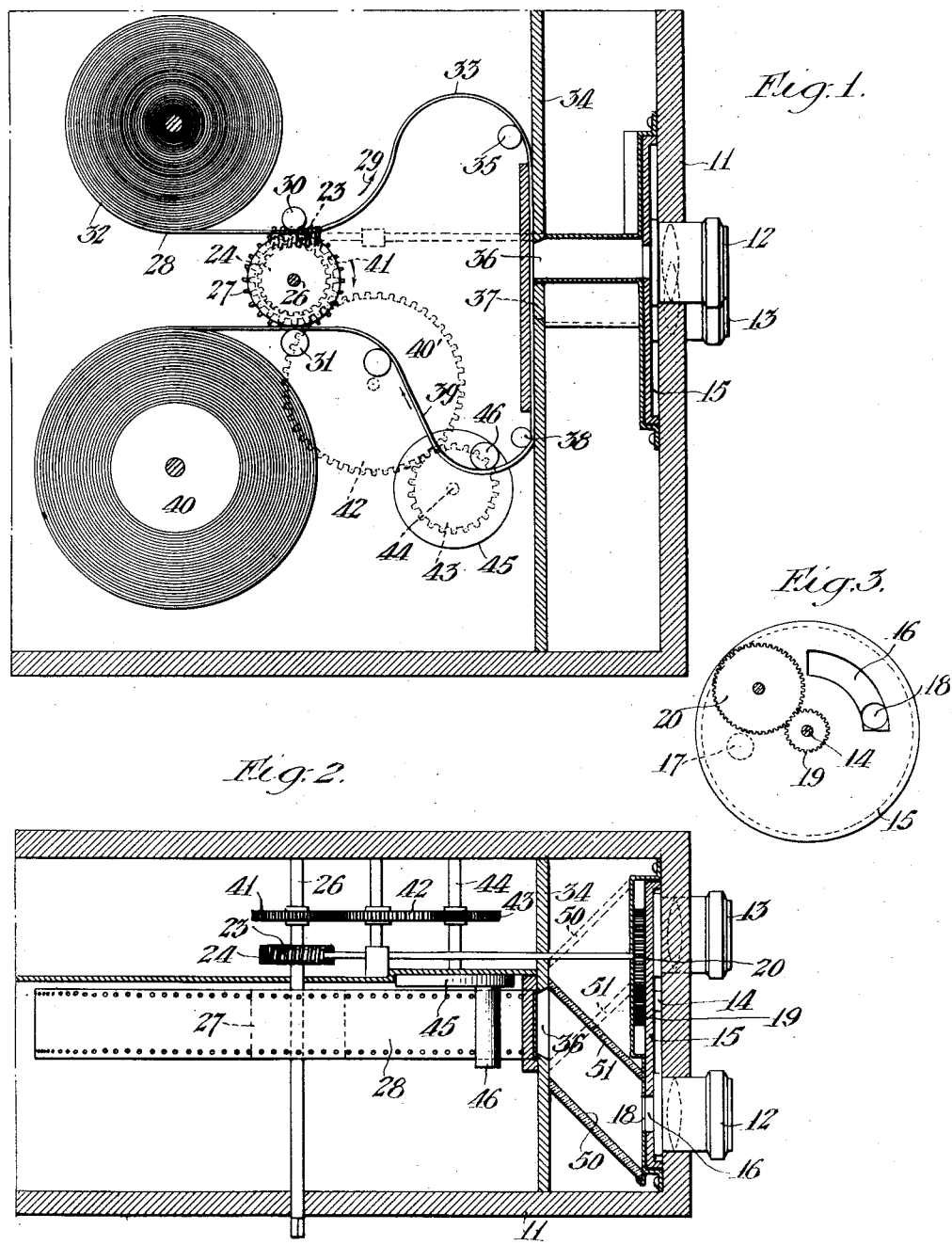

UNITED STATES PATENT OFFICE.

HENRY K. NORTON, OF LOS ANGELES, CALIFORNIA.

DUPLEX STEREOSCOPIC MOTION-PICTURE CAMERA.

1,267,689.

Specification of Letters Patent.

Patented May 28, 1918.

Application filed July 1, 1916. Serial No. 107,477.

*To all whom it may concern:*

Be it known that I, HENRY K. NORTON, a citizen of the United States, residing at Los Angeles, in the county of Los Angeles and State of California, have invented a new and useful Duplex Stereoscopic Motion-Picture Camera, of which the following is a specification.

My invention relates to the motion picture art. The principal object of the invention is to produce a camera by which a certain type of stereoscopic film may be produced. This stereoscopic film consists of a standard motion picture film upon which are impressed alternate right and left eye images of the same scene, these images corresponding to the right and left eye images of an ordinary stereoscopic photograph, and being taken from two view points separated by the same distance as the pupilary distance between two average adult human eyes. This type of stereoscopic film may be used in the projection of stereoscopic images on the screen by a suitable projector.

Referring to the drawings, which are for illustrative purposes only:

Figure 1 is a section through a motion picture camera embodying my invention.

Fig. 2 is a plan partly in section of the same camera.

Fig. 3 is a front elevation of the shutter.

The camera consists of a light tight box 11 in the front of which is placed a right hand lens system 12 and a left hand lens system 13, these two lens systems being focused on the same field of space, and being separated by a distance equal to the pupilary distance between a pair of average adult human eyes. Turning freely on a stationary shaft 14 directly behind the lens systems 12 and 13 is a shutter 15, this shutter having a single shutter aperture 16 so placed as to alternately register with lens apertures 17 and 18 of the lens systems 12 and 13. Rigidly secured to the shutter 15 is a pinion 19 which is driven from a gear 20 which is secured to a shaft 21. The shaft 21 is driven through a spiral gear 23 by a spiral gear 24 which is secured to an operating shaft 26, this operating shaft 26 being operated by a crank, motor, or any other convenient driving means, not shown. Centrally secured on the shaft 26 is a driving sprocket 27, this sprocket feeding a film 28 in the direction of the arrow 29, rollers 30 and 31 being provided above and below the sprocket 27 to assist in this action. The film 28 is wound from a reel 32 passing between the roller 30 and the sprocket 27, and forming an upper loop 33 being guided against an exposure aperture plate 34 by means of a roller 35. The film then passes down by an upper exposure aperture 36 and a lower exposure aperture 37, and is guided by a roller 38 to form a lower loop 39, passing over a roller 40' and between the rollers 31 and the sprocket 27 and being wound on the reel 40. The reel 40 is driven by suitable mechanism not shown from the shaft 26 in accordance with standard practice in motion picture cameras.

For the purpose of advancing the film intermittently a pinion 41, an idler gear 42, and a pinion 43 are supplied, the pinion 43 being secured to a shaft 44 which carries a beater disk 45, this disk having a beater pin 46 secured on the side thereof next the periphery, this beater pin 46 being so located that it engages the lower loop 39 upon each revolution of the shaft 44, pulling the film 28 downwardly at each revolution of that shaft at a distance slightly greater than the sum of lengths of the exposure apertures 36 and 37.

For the purpose of directing the image formed by the lens systems 12 and 13 to the proper location on the film, certain light deflecting means are employed. In the form of the invention illustrated, these means consist of a primary mirror 50 and a secondary mirror 51 for each of the lens systems. The lens system 12 and its mirrors 50 and 51 are placed in a plane above the lens system 13 and its mirrors 50 and 51, being so arranged that the light striking the primary mirror 50 from the lens system 12 is deflected across the camera against the secondary mirror 51, and from the secondary mirror 51 is directed through the aperture 36 against the film 28. In a similar manner the image from the lens system 13 is directed by means of the primary mirror 50 and the secondary mirror 51 through the aperture 37 against the film 28.

The method of operation is as follows:

The shaft 26 being driven by any convenient means, such as a crank, not shown, the film 28 is wound on the reel 40, and is drawn from the reel 32, passing in the direction of the arrow 29 over the various rollers and by the apertures 36 and 37. The steady feed of the film produced by the sprocket 27 merely serves to lengthen the upper loop 33, and shorten the lower loop 39, without any movement of the film by the apertures 36 and 37. The movement of the film by the apertures 36 and 37 is produced by the beater pin 46, the various gearing of the camera being so arranged that this movement takes place in one of the two dark intervals between exposures. The shutter 15 is so driven by the means explained above from the shaft 26 that the shutter aperture 16 coincides with the lens apertures 17 and 18 alternately once during each revolution of the shutter. This results in an alternate exposure by each lens system, and photographic impressions are produced alternately on the film 28 through the apertures 36 and 37, the image formed through the aperture 36 being a right hand image, and the image formed through the aperture 37 being a left hand image. In one of the dark intervals between exposures, the beater pin engages the loop 39 and pulls the film 28 down to position for a second pair of exposures. By this means a motion picture film is produced having alternate right and left hand images thereon, and this film may be used in a suitable projector for producing stereoscopic views.

It will be readily understood from the foregoing description that with a camera constructed as above described, images from two sets of lens systems may be directed on a film without the interposition of any moving parts between the lens and the film to deflect or reflect the light.

I claim as my invention:—

1. A motion picture camera comprising a light tight box; a film in said box; two sets of lens systems rigidly secured in the front wall of said box and focused on the same field of view, the centers of said lenses being approximately the same distance apart as the distance between the centers of an average pair of adult human eyes; a shutter having an aperture so placed that an exposure may be made alternately through both lenses; a pair of primary mirrors each so placed as to turn the light rays from one of said lenses toward the center of said box; a pair of secondary mirrors each arranged to direct said light rays on said film, said lenses and mirrors being so arranged that the image from one lens falls upon the film directly below the image from the other lens; and mechanism for advancing the film a distance a little greater than the length of the two said images during one of the two dark intervals between exposures.

2. A motion picture camera comprising a light tight box; a film in said box; two sets of lens systems rigidly secured in the front wall of said box and focused on the same field of view, the centers of said lenses being approximately the same distance apart as the distance between the centers of an average pair of adult human eyes; means for alternately making an exposure through both lens systems; a pair of primary mirrors each so placed as to turn the light rays from one of said lenses toward the center of said box; a pair of secondary mirrors each arranged to direct said light rays on said film, said lenses and mirrors being so arranged that the image from one lens falls upon the film directly below the image from the other lens; and mechanism for advancing the film a distance a little greater than the length of the two said images during one of the two dark intervals between exposures.

3. A motion picture camera comprising a light tight box; a film in said box; two sets of lens systems rigidly secured in the front wall of said box and focused on the same field of view, the centers of said lenses being approximately the same distance apart as the distance between the centers of an average pair of adult human eyes; a shutter having an aperture so placed that an exposure may be made alternately through each lens; means for directing the image from one lens to a portion of said film below the image projecting thereon from the other lens; and mechanism for advancing the film a distance a little greater than the length of the two said images during one of the two dark intervals between exposures.

4. A motion picture camera comprising a light tight box; a film in said box; two sets of lens systems rigidly secured in the front wall of said box and focused on the same field of view, the centers of said lenses being approximately the same distance apart as the distance between the centers of an average pair of adult human eyes; means for alternately making an exposure through each lens; means for directing the image from one lens to a portion of said film below the image projecting thereon from the other lens; and mechanism for advancing the film a distance a little greater than the length of the two said images during one of the two dark intervals between exposures.

In testimony whereof, I have hereunto set my hand at Los Angeles, California, this 21st day of June, 1916.

HENRY. K. NORTON.